(No Model.) 2 Sheets—Sheet 1.
W. H. BELL.
SAFETY CAR FENDER.
No. 563,439. Patented July 7, 1896.
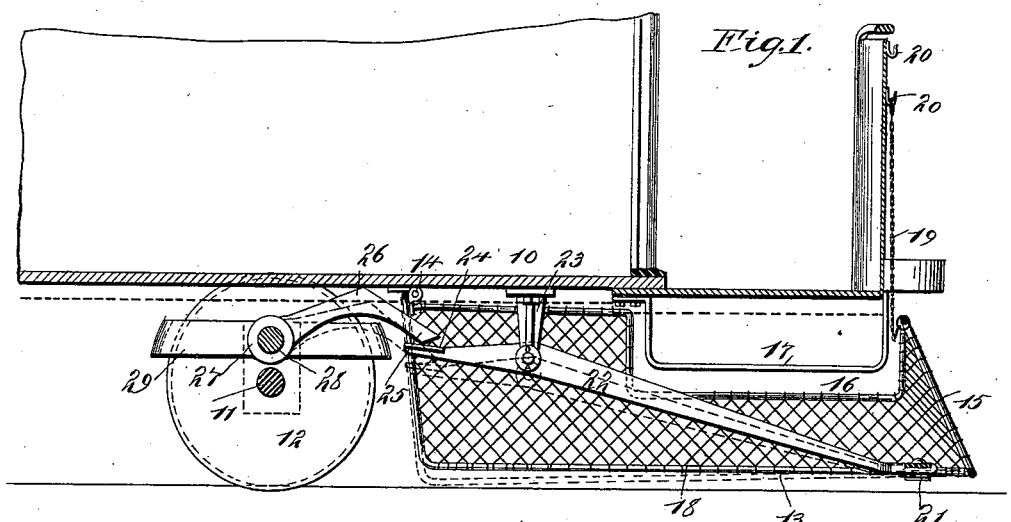
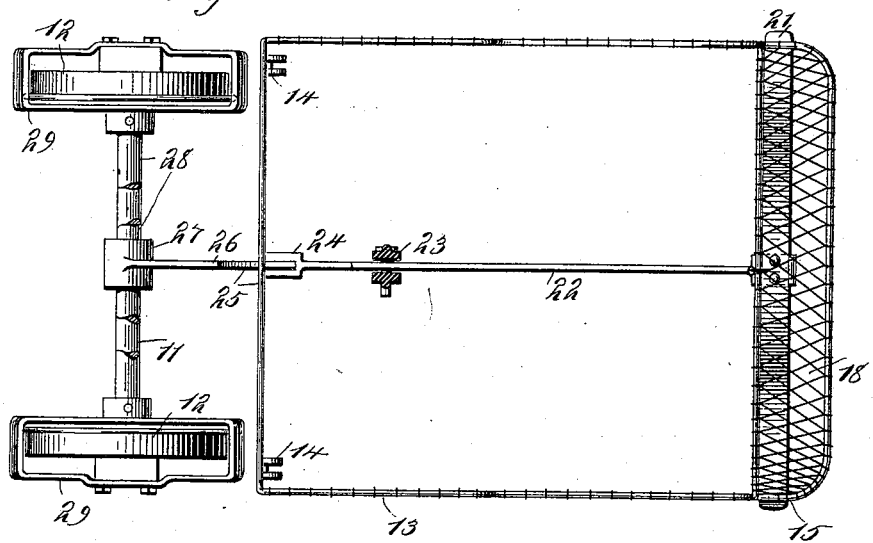
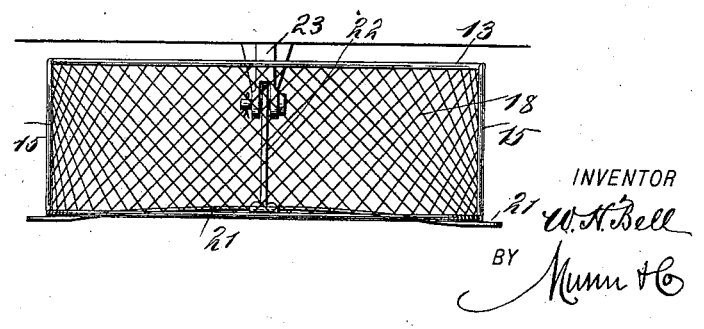
WITNESSES:
John A. Rennie
C. Sedgwick
INVENTOR
W. H. Bell
BY
Munn & Co.
ATTORNEYS.

(No Model.) 2 Sheets—Sheet 2.

W. H. BELL.
SAFETY CAR FENDER.

No. 563,439. Patented July 7, 1896.

WITNESSES:
John A. Rennie
C. Sedgwick

INVENTOR
W. H. Bell
BY
Munn & Co.
ATTORNEYS.

UNITED STATES PATENT OFFICE.

WILLIAM H. BELL, OF NEW YORK, N. Y.

SAFETY CAR-FENDER.

SPECIFICATION forming part of Letters Patent No. 563,439, dated July 7, 1896.

Application filed October 26, 1893. Serial No. 489,194. (No model.)

*To all whom it may concern:*

Be it known that I, WILLIAM H. BELL, of the city, county, and State of New York, have invented a new and Improved Safety Car-Fender, of which the following is a full, clear, and exact description.

My invention relates to improvements in that class of fenders which are used on the ends of cars, and particularly on street-cars propelled by electricity, cables, and the like, to prevent people from being run down and thrown beneath the cars. The objection to most fenders of this kind is that when the car is rocking or is heavily loaded it brings the fender into actual contact with the ground, and when the car is lightly loaded the fender is too high, and, moreover, the fender is usually connected with the car in such a way that it cannot ride easily over any small obstruction on the track.

The object of my invention is to produce a very simple safety car-fender, which may be very easily applied to any ordinary car, which may ride readily over any small obstruction, and which is actuated by the rise and fall of the car in such a way as to maintain the front of the fender at a substantially constant height, which height may be easily regulated so as to be just the right distance from the ground.

To these ends my invention consists of certain features of construction and combinations of parts, as will be hereinafter described and claimed.

Reference is to be had to the accompanying drawings, forming a part of this specification, in which similar figures of reference indicate corresponding parts in all the views.

Figure 4:
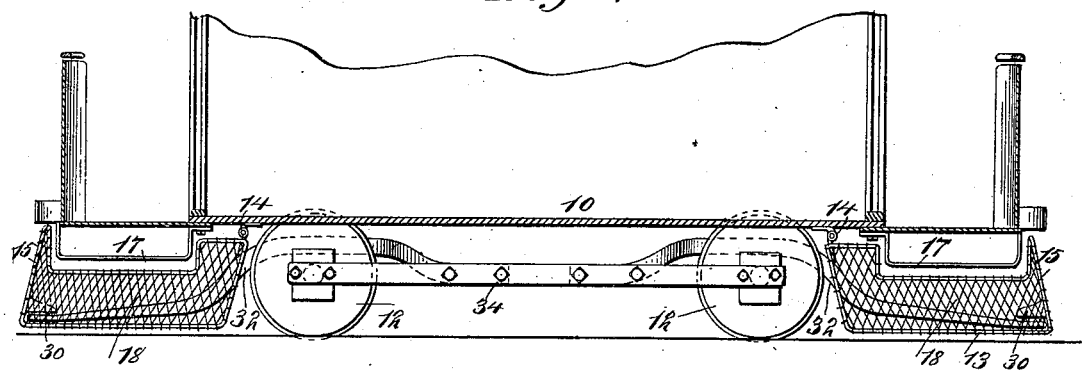
Figure 5:
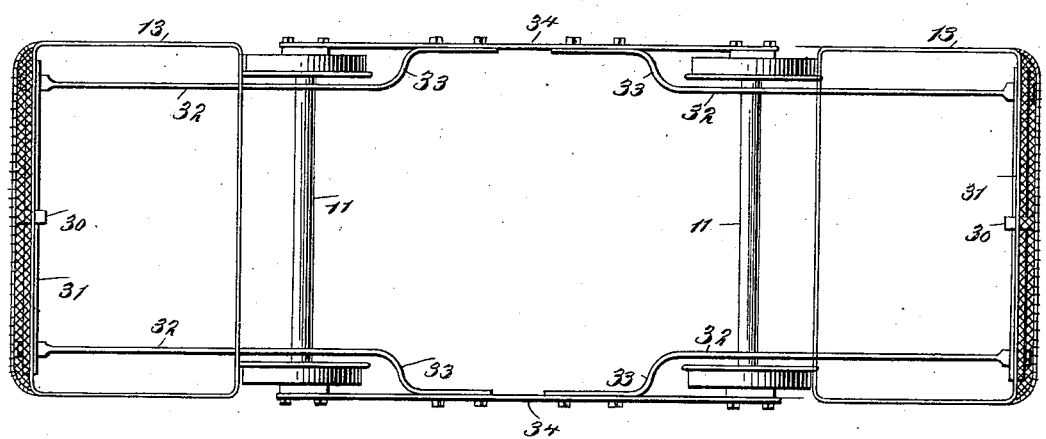

Figure 1 is a sectional elevation of a car provided with my improved fender. Fig. 2 is a sectional plan of the same. Fig. 3 is a detail front elevation of the fender. Fig. 4 is a side elevation of a modified form of the device as applied to a car, the car being shown in section; and Fig. 5 is a plan view of the modified form of the apparatus as applied to the car-trucks.

The car 10 is of the usual kind, riding on the axles 11 and wheels 12, and the safety-fender is hung near the end of the car beneath the car-floor, the fender having a frame 13, which is of a generally rectangular shape, and which is made as light as is consistent with the strength required of it, the frame extending the full width of the car and being of a height to reach substantially from the car-floor to the ground.

The frame of the fender is at its rear end and upper edge hinged, as shown at 14, to the car-bottom or to journal-boxes, and the front portion of the frame and fender is inclined, as shown at 15, that it may the better ward off any obstruction with which it comes in contact. The upper side of the fender is recessed, as shown at 16, to make room for the car-steps 17, but the fender, while being preferably of the shape illustrated, may be of any suitable shape, and the frame may be constructed in any suitable manner.

The sides and front of the frame are covered by a netting 18 of sufficient strength to ward off any ordinary obstruction, and to prevent a person from passing through the fender-frame beneath the car. The front end of the fender is provided with a chain 19, extending from the top of the fender and connecting with one of a series of hooks 20 on the dash-board of the car, and to raise the fender over any unusual obstruction or when housing the car.

The front end of the fender rests on a transverse spring-bar 21, which is preferably bent upward slightly in the center, at which point it is secured to the lower front end of a lever 22, which lever extends rearward and upward, is fulcrumed in a hanger 23, suspended from the car-bottom, and terminates at its rear end in a bearing-plate 24, which, on its upper surface, contacts with the free end of an arm 25, this arm having an elbow 26, bent upward to engage the car-floor, while the rear end of the arm terminates in a collar 27, which is journaled on a shaft 28, the latter being supported in strap-like frames 29, which are secured to the journal-boxes of the axle 11.

It will be seen then from the above description that when the car is heavily loaded or rocking it will press downward on the arm 25, which acting on the lever 22 depresses the rear end of the lever and raises the front end, thus raising the front end of the safety-fender so that the said front portion of the fender will be no nearer the ground than when the car is lightly loaded, and when the car is relieved of its load the lever 22 resumes its normal position, and the fender is thus held at a substantially constant height.

This spring-bar 21 is stiff enough to hold up the fender under normal conditions; but if a body is projected against the front of the fender the extra weight depresses the end portions of the bar, so that the fender is carried down snug to the ground and there is no possibility of a person or any portion of the person being caught beneath it. I have shown an arm 25, hung on a shaft 28 and actuated by the depression of a car to tilt the lever 22 and move the fender; but the arm may be journaled directly on the axle 11, if desired, with the same effect, although a separate shaft is preferably employed to save friction.

It will also be understood that many other arrangements similar to that of the arm may be used for tilting the lever by the depression of the car, so as to raise the front end of the fender, and therefore I do not limit myself to the mechanism shown, but claim, broadly, any operative device for regulating the height of the fender by the rise and fall of the car.

In Figs. 4 and 5 I have shown a modified form of the safety-fender, or rather a modified means of maintaining the fender at a uniform height. As here shown, the fender is hinged beneath the car-floor, as already described, but it is supported at its front end in a different way. The fender-frame 13 has, at its front end and inner side, a lug 30, beneath which rests the transversely-extending spring-bar 31, and beneath the ends of the bar are the front ends of the supporting-leaves 32, which extend beneath the car and above the axles 11, the inner ends of the leaves being bent outward, as shown at 33, and fastened securely to the sides 34 of the truck-frame.

It will be observed that this modified arrangement permits the fender to be swung upward to pass an obstruction, and as it is supported independent of the car-floor, it is always held at a uniform height.

Having thus described my invention, I claim as new and desire to secure by Letters Patent—

1. The combination, with the car and the safety-fender hinged beneath it and projecting forward, of a spring supporting-bar extending transversely beneath the front end of the fender, and a supporting-lever pivoted below the car and connected at its forward part to said spring supporting-bar, substantially as described.

2. The combination, with the car and the fender hinged beneath it and projecting forward, of a lever fulcrumed beneath the car-bottom and suspended from the car-bottom, a spring-bar secured to the front end of the lever and supporting the front end of the fender, and a bent arm fulcrumed beneath the car, the arm having its elbow adapted to contact with the car-bottom and its free end arranged to engage the rear end of the fender-lever, substantially as described.

3. The combination, with the car and the forwardly-projecting fender hinged beneath it, of the lever fulcrumed beneath the car-bottom, the cross-bar at the front end of the lever for supporting the front end of the fender, a shaft supported beneath the car-bottom, and a bent arm supported on the shaft, the arm having its elbow adapted to contact with the car-bottom and its free end arranged to engage the rear end of the lever, substantially as described.

4. The combination of a car, a fender pivotally mounted below the same and having its forward end movable toward and from the track, a supporting-lever, a spring connection between the forward end of said lever and the fender, and means connected to the opposite end of said supporting-lever and operated by the vertical movement of the car-body, to raise and lower the forward end of the fender away from and toward the track, substantially as set forth.

WILLIAM H. BELL.

Witnesses:
WARREN B. HUTCHINSON,
C. SEDGWICK.